Patented July 9, 1935

2,007,545

UNITED STATES PATENT OFFICE 2,007,545

PROCESS FOR TREATING ANTIMONIAL LEAD

Harold H. Monson, Omaha, Nebr., assignor to American Smelting and Refining Company, New York, N. Y., a corporation of New Jersey No Drawing. Application May 27, 1933
Serial No. 673,321

7 Claims. (Cl. 75—15)

This invention relates to a process for treating antimonial lead to effect the separation and recovery of antimony in a concentrated form.

Among other features, the invention provides a process by which approximately two-thirds of the antimony content of antimonial lead mixtures or alloys, analyzing 20% or more antimony and preferably from 25% to 35% of that element, may be effectively and expeditiously concentrated in a product analyzing from approximately 65% to approximately 80% antimony. The invention also provides for the production of antimonial lead metal comprising antimony and lead in approximately eutectic proportions.

In accordance with the present invention, the crude metal, i. e. antimonial lead containing 20% or more of antimony and which may or may not contain various impurities as will be hereinafter described in more detail, is heated to appropriate temperatures and subjected to a combined mixing and cooling operation. This treatment results in the formation of an intermediate, mushy, leady, antimony dross. Thereafter, the intermediate mushy dross is treated with a suitable drying agent which eliminates much of the lead from the mushy dross and yields the antimony as a concentrated dry dross which may readily be separated from the remaining metal and utilized as desired.

More specifically, the improved process may be practised by charging crude metal comprising 25% to 35% antimony and the balance substantially lead to an ordinary refining kettle and heating same to a temperature of approximately 750° F. to 800° F. Any dross may be removed from the surface of the bath and a mixing apparatus of conventional design placed in operating position in the clean bath of metal. The metal is then simultaneously agitated and cooled. It has been found that a gradual diminution of from 15° F. to 25° F. per hour in temperature until the bath is cooled to approximately 550° F. to 525° F. is well suited for commercial practise.

As the temperature decreases and the mixing continues, an intermediate, mushy, leady dross having an antimony concentration appreciably in excess of that possessed by the original metal forms on the surface of the bath and from this mushy dross the final high antimony product is obtained. The treatment of the intermediate dross to dry and concentrate same in the final product is preferably effected by incorporating petroleum coke or rosin or both in the mushy dross in situ. The amount of drying agent required is comparatively small, 100 lbs. to 200 lbs. of petroleum coke and 5 lbs. or less of rosin usually being sufficient for a charge of 100 tons. The action of the petroleum coke and/or rosin upon the mushy dross not only removes a great part of the lead from the dross but also yields the final high antimony product in a state which facilitates removal of same from the bath and subsequent handling.

When the drying action is complete, the high antimony product (70% to 80% Sb) comprising a dry dross having particles ranging in size from powder up to one-sixteenth or one-eighth of an inch and possessing a dark grey to black color may be shovelled from the bath. The temperature may then be lowered to approximately 490° F. at which point a crust containing the excess of antimony over the eutectic ratio of lead and antimony will form. The molten metal which consists of a eutectic of lead and antimony may then be removed by pumping or otherwise and a fresh charge made to the kettle containing the crusts.

While the foregoing description illustrates how the invention may be utilized in the production of a concentrated antimony product containing from 70% to 80% antimony and an antimonial lead alloy in eutectic ratio (approximately 13% Sb) from an antimonial lead metal, it is to be understood in the present specification and claims that appreciable quantities of other elements may be present in the antimonial lead and that the term by definition may include appreciable amounts of other elements, the most common generally being tin, copper and arsenic. For example, in a series of tests conducted with crude metal containing from 30% to 35% antimony, 1% to 2% copper, 1% to 2% arsenic, approximately 0.2% tin, 0.2% tellurium and nickel and the balance substantially lead, a high antimony dross containing on an average of 75% antimony was consistently obtained.

If the crude antimonial lead metal contains considerable tin, it is preferable to remove same at the start of the process as tin-free antimonial lead has been found to yield an intermediate, mushy dross which may be more readily dried than when appreciable quantities of tin are present. Accordingly, the crude metal may be heated to a temperature of approximately 1000° F. under suitable conditions of oxidation when the charge is first made to the kettle and the resulting tin dross removed. The process may then be conducted as hereinbefore outlined. It may also be mentioned that a better final product is obtained both from the standpoints of physical condition and antimony concentration when the tin has been initially removed. Also, the preliminary tin removal step is essential when a tin-free final antimony product is desired. What has been said regarding tin similarly applies to arsenic.

The invention is applicable to the treatment of various antimonial lead products with or without other impurities and which contain at least 20% and preferably 25% to 35% antimony. A common source of metal for treatment by the process is the softener skims obtained from lead softening furnaces. While in many instances, the antimony content of these skims is below the concentration, i. e. 20% or more, required for successful commercial operation of the present process such concentration may readily be obtained by smelting such skims in a blast furnace or otherwise increasing the antimony content to the requisite amount. Various other sources of crude material may likewise be brought to the proper concentration when necessary for treatment according to the invention.

It will thus be appreciated that the present invention provides an efficient and economical commercial process for the treatment of antimonial lead alloys of the class described to effect the separation of a major portion of the antimony as a concentrated final product. The utility of the invention is well illustrated by the following example: one thousand tons of antimonial lead containing 30% antimony were treated according to the present process. As a result, 726 tons of metal were obtained containing 13% antimony or less than one-third of the antimony content of the metal treated. At the same time, over two-thirds of the antimony content of the original metal was concentrated in 274 tons of high antimony dross which analyzed approximately 75.2% antimony.

While certain novel features of the invention have been disclosed and are pointed out in the annexed claims, it will be understood that various omissions, substitutions and changes may be made by those skilled in the art without departing from the spirit of the invention.

What is claimed is:

1. The method for obtaining metal comprising antimony and lead in eutectic ratio and a concentrated antimony product analyzing 70% to 80% antimony from antimonial lead containing from 25% to 35% antimony which consists in simultaneously mixing and cooling molten antimonial lead of the class described to a temperature approaching the freezing point of same thereby obtaining a mushy, lead containing, antimony dross, treating said dross in situ with a drying agent thereby concentrating antimony as a dry dross, removing said dross, cooling the remaining metal sufficiently to freeze out antimony in excess of the eutectic ratio and withdrawing eutectic metal from the process.

2. The method of separating the major portion of antimony in lead-antimony alloys containing from 25% to 35% antimony from such alloys which comprises simultaneously mixing and cooling such alloys in the molten state to temperatures approximating 550° F. to 525° F. whereby a mushy, leady, antimony dross is produced and treating said dross in situ with petroleum coke and/or rosin thereby concentrating antimony as a dry dross analyzing from 70% to 80% antimony.

3. The process for treating antimonial lead containing 20% or more of antimony which comprises drossing such lead at temperatures approximating 750° F. to 800° F., mixing the molten metal and cooling same at the rate of approximately 15° F. to 25° F. per hour to a temperature approximating 550° F. to 525° F. thereby obtaining antimony as a leady dross, treating said dross in situ by incorporating petroleum coke and rosin therein thereby concentrating antimony in a dry dross, removing said dry dross, cooling said bath to a temperature approximating 490° F. thereby freezing as a crust the major portion of antimony in the bath in excess of the lead-antimony eutectic, separating the eutectic metal from said crust, incorporating further quantities of antimonial lead with said crust and cyclically repeating the process.

4. The process for treating an antimony-lead alloy having an antimony content exceeding 20 per cent which comprises melting and drossing the alloy within an approximate temperature range of 750° F. to 800° F., simultaneously mixing the resultant molten alloy and gradually lowering the temperature thereof to a range of approximately 550° F. to 525° F. thereby obtaining a mushy, leady dross possessing an antimony content appreciably in excess of that possessed by the alloy treated, incorporating a drying agent in said dross in quantity sufficient to yield a dry, powdery final dross having an antimony concentration of from sixty-five to eighty per cent and removing said final dross.

5. The process of treating alloys of lead and antimony containing 20% or more of the latter element comprising forming a molten bath thereof, simultaneously agitating said bath and gradually lowering the temperature of same thereby concentrating antimony as a mushy, leady dross upon the surface of said bath, treating said dross in situ with a drying agent thereby yielding a dry antimony dross product containing approximately 65% to 80% antimony and effecting a separation between said antimony product and the remaining metal of the bath.

6. The process for treating lead containing antimony in excess of 20% and appreciable quantities of tin which comprises forming a molten bath of such metal, mixing and drossing the metal clean at a temperature approximating 800° F., heating the bath to approximately 1000° F. under conditions of oxidation and agitation for a period of time sufficient to concentrate the bulk of the tin as a dross, removing said dross, simultaneously cooling and mixing the remaining metal thereby forming a leady antimony dross, incorporating a drying agent in said dross thereby concentrating the antimony in a dry powdery dross and removing the dry, concentrated, antimony dross from said bath.

7. The method of recovering a high antimony product from lead softener skims containing antimony and tin which comprises smelting same to yield a crude metal containing 20% or more of antimony, subjecting such crude metal to oxidizing conditions for a time sufficient to concentrate the bulk of the tin as an oxidized tin dross, removing said tin dross, simultaneously mixing and cooling the remaining metal to a temperature of approximately 550° F. thereby concentrating antimony in a mushy, leady mass, treating said mass with a drying agent thereby obtaining antimony as a dry, powdery dross having an antimony concentration of approximately 65% to 80% and removing said antimony dross.

HAROLD H. MONSON.